(12) United States Patent
Kobayashi et al.

(10) Patent No.: US 8,273,494 B2
(45) Date of Patent: Sep. 25, 2012

(54) FUEL CELL STACK

(75) Inventors: Tsuyoshi Kobayashi, Wako (JP);
Kimiharu Mizusaki, Wako (JP);
Tadashi Nishiyama, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 13/224,296

(22) Filed: Sep. 1, 2011

(65) Prior Publication Data

US 2012/0058411 A1 Mar. 8, 2012

(30) Foreign Application Priority Data

Sep. 2, 2010 (JP) ................ 2010-196345

(51) Int. Cl.
*H01M 8/24* (2006.01)
(52) U.S. Cl. ...................... 429/465; 429/434
(58) Field of Classification Search .......... 429/465, 429/434
See application file for complete search history.

(56) References Cited

U.S. PATENT DOCUMENTS

| 6,723,463 B2 | 4/2004 | Sugita et al. |
| 6,764,786 B2 | 7/2004 | Morrow et al. |
| 2004/0142228 A1* | 7/2004 | Komura et al. ............ 429/38 |
| 2006/0110649 A1* | 5/2006 | Nishiyama et al. ........ 429/38 |
| 2009/0311571 A1* | 12/2009 | Takahashi et al. ........ 429/30 |

FOREIGN PATENT DOCUMENTS

| JP | 2002-184449 | 6/2002 |
| JP | 2004-327366 | 11/2004 |
| JP | 2007-048547 | 2/2007 |

* cited by examiner

*Primary Examiner* — Jennifer Michener
*Assistant Examiner* — Monique Wills
(74) *Attorney, Agent, or Firm* — Ditthavong Mori & Steiner, P.C.

(57) ABSTRACT

A fuel cell stack includes a stack of fuel cells. Each of the fuel cells includes a membrane electrode assembly and a separator that are stacked. The membrane electrode assembly includes an electrolyte membrane and a pair of electrodes sandwiching the electrolyte membrane therebetween. The terminal plate, the insulation plate, and the end plate are stacked at each end of the stack of the fuel cells in a stacking direction of the fuel cells. The terminal plate has a plurality of spaces formed therein. The spaces are separated from each other by a partition wall. A connection terminal is disposed on a plate surface of the terminal plate. The plate surface faces the insulation plate, at a position at which the connection terminal does not overlap the partition wall in the stacking direction. The connection terminal protrudes outward from the end plate in the stacking direction.

9 Claims, 6 Drawing Sheets

FUEL CELL STACK

CROSS-REFERENCE TO RELATED APPLICATIONS

The present application claims priority under 35 U.S.C. §119 to Japanese Patent Application No. 2010-196345, filed Sep. 2, 2010. The contents of this application are incorporated herein by reference in their entirety.

BACKGROUND OF THE INVENTION

1. Field of the Invention

The present invention relates to a fuel cell stack.

2. Discussion of the Background

A solid-polymer electrolyte fuel cell, for example, includes power generation units. Each of the power generation units includes a membrane electrode assembly (MEA) and a pair of separators sandwiching the MEA therebetween. The MEA includes an electrolyte membrane, which is a polymer ion-exchange membrane, and an anode electrode and a cathode electrode sandwiching the electrolyte membrane therebetween. This type of fuel cell is used in a fuel cell stack, which usually includes a stack of a certain number (for example, hundreds) of such power generation units.

The fuel cell stack, which includes a stack of the power generation units, also includes a terminal plate, an insulation plate, and an end plate that are stacked at each end of the stack of the power generation units in the stacking direction.

For example, Japanese Unexamined Patent Application Publication No. 2002-184449 describes a solid polymer electrolyte fuel cell stack. The solid polymer electrolyte fuel cell stack includes a stack of power generation units that are stacked in a horizontal direction. Each of the power generation units includes a pair of electrodes sandwiching a solid polymer electrolyte membrane therebetween and a pair of separators sandwiching the pair of electrodes therebetween. A heat insulating layer is interposed between a power generation unit that is disposed at least one end of the stack in the stacking direction and a terminal plate disposed outside the power generation unit.

The solid polymer electrolyte fuel cell stack has the heat insulating layer between the terminal plate and the power generation unit at the end in the stacking direction

SUMMARY OF THE INVENTION

According to one aspect of the present invention, a fuel cell stack includes a stack of fuel cells, a terminal plate, an insulation plate and an end plate. Each of the fuel cells includes a membrane electrode assembly and a separator that are stacked. The membrane electrode assembly includes an electrolyte membrane and a pair of electrodes sandwiching the electrolyte membrane therebetween. The terminal plate, the insulation plate, and the end plate are stacked at each end of the stack of the fuel cells in a stacking direction of the fuel cells. The terminal plate has a plurality of spaces formed therein. The spaces are separated from each other by a partition wall. A connection terminal is disposed on a plate surface of the terminal plate. The plate surface faces the insulation plate, at a position at which the connection terminal does not overlap the partition wall in the stacking direction. The connection terminal protrudes outward from the end plate in the stacking direction.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings.

DESCRIPTION OF THE EMBODIMENTS

Figure 1:
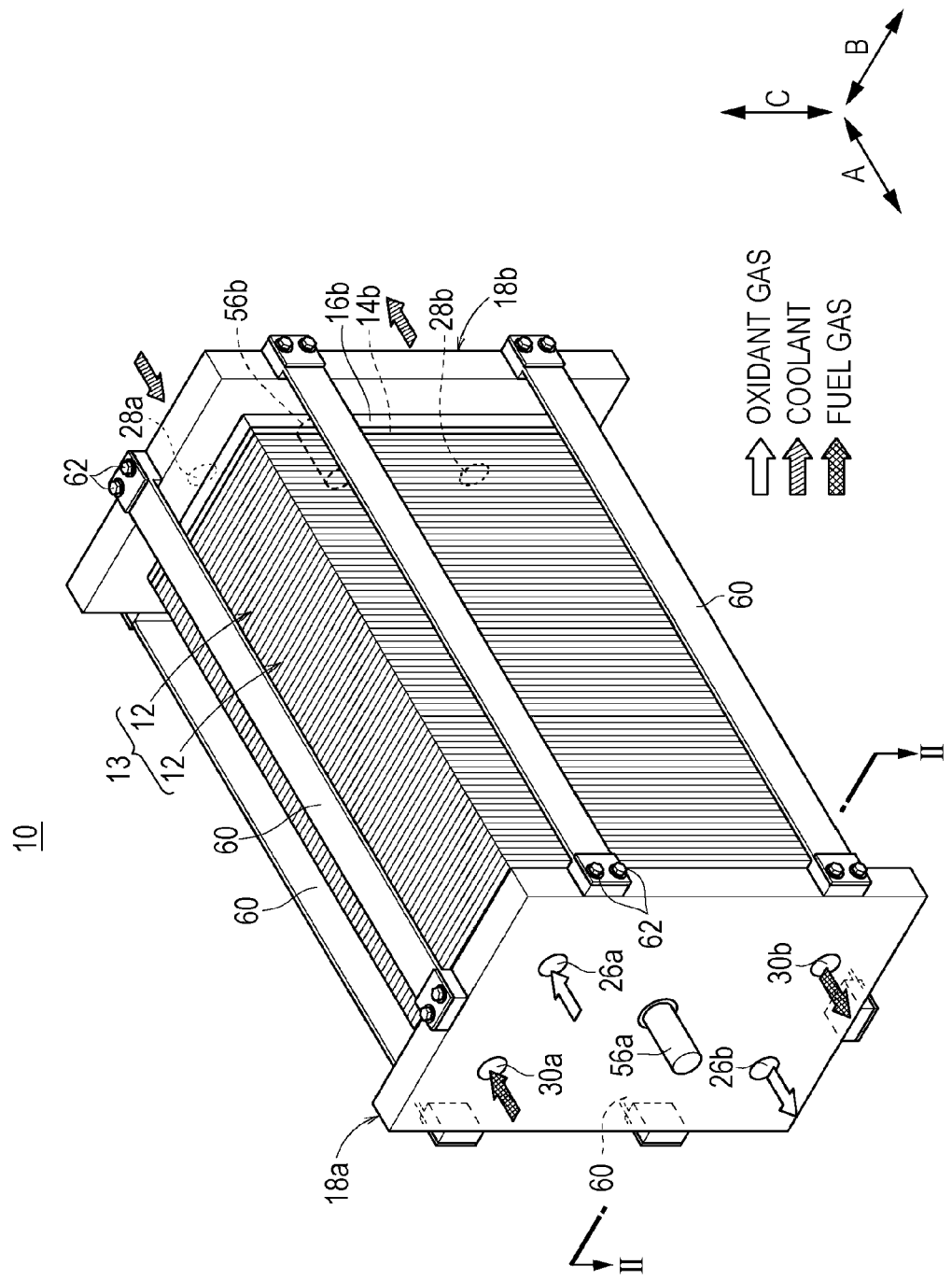
FIG. 1 is a perspective view of a fuel cell stack according to a first embodiment of the present invention.
Figure 2:
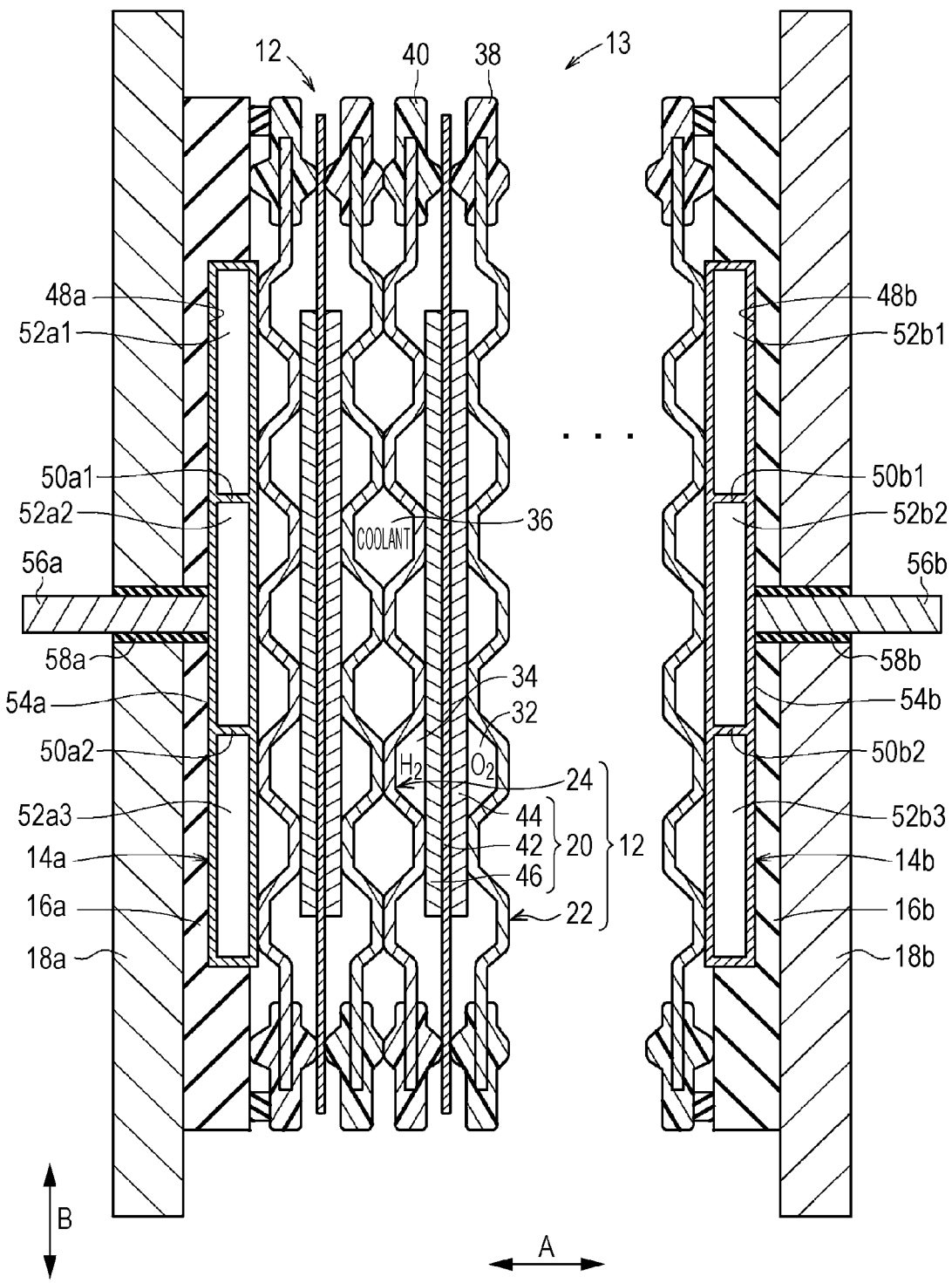
FIG. 2 is a sectional view of the fuel cell stack taken along line II-II of FIG. 1.

The embodiments will now be described with reference to the accompanying drawings, wherein like reference numerals designate corresponding or identical elements throughout the various drawings. As illustrated in FIGS. 1 and 2, a fuel cell stack 10 according to a first embodiment of the present invention includes a stack 13 of a plurality of fuel cells 12 (power generation units). The fuel cells 12 are stacked in the direction of arrow A (horizontal direction) or arrow C (gravitational direction).

At one end of the stack 13 in the stacking direction, a terminal plate 14a, an insulation plate 16a, and an end plate 18a are arranged. At the other end of the stack 13 in the stacking direction, a terminal plate 14b, an insulation plate 16b, and an end plate 18b are arranged.

Figure 3:
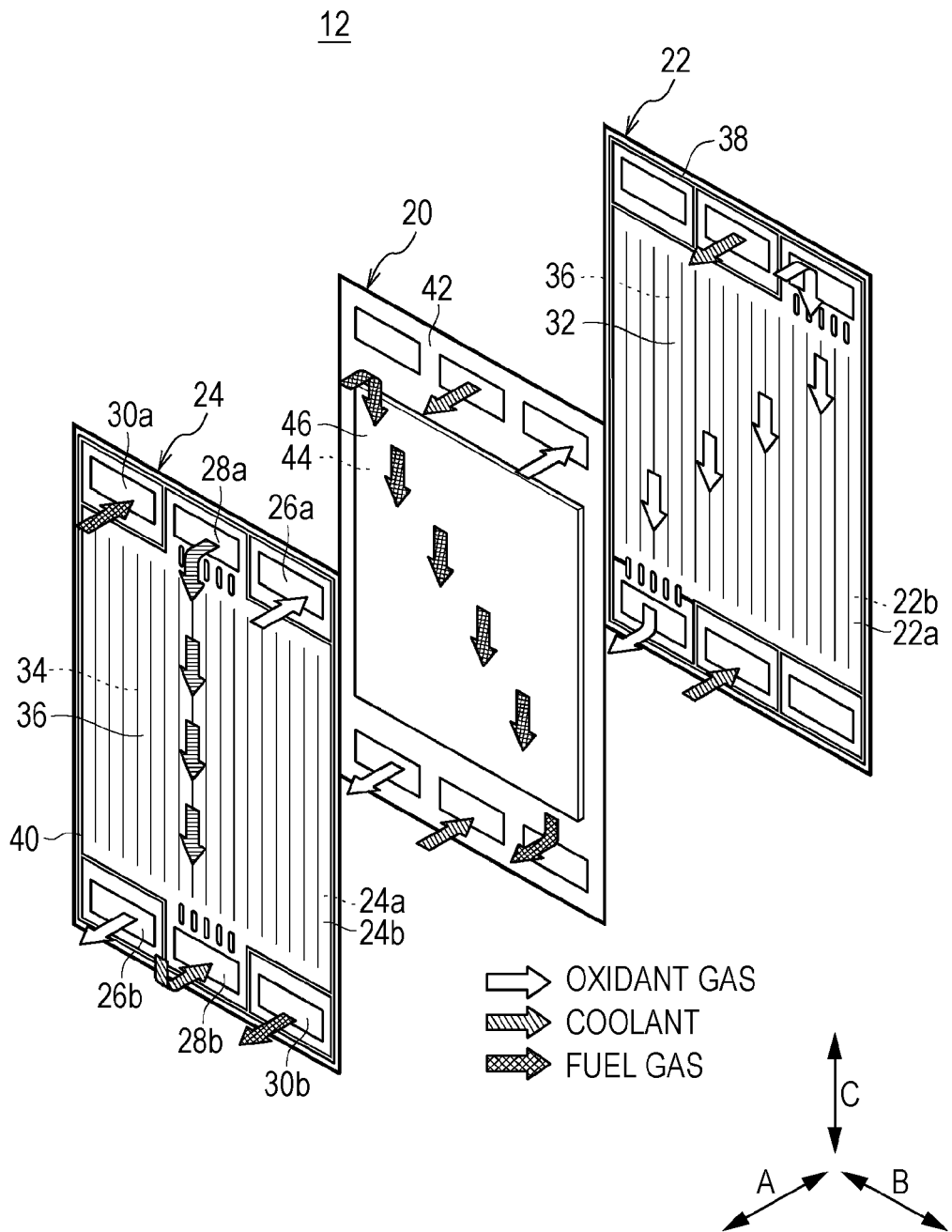
FIG. 3 is an exploded perspective view of a main part a fuel cell of the fuel cell stack.

As illustrated in FIGS. 2 and 3, each of the fuel cells 12 includes a membrane electrode assembly (MEA) 20, and first and second separators 22 and 24 that sandwich the membrane electrode assembly 20 therebetween. The first and second separators 22 and 24 are each made of, for example, an oblong metal plate such as a steel plate, a stainless steel plate, an aluminum plate, a galvanized steel plate, or any of such metal plates coated with an anti-corrosive coating. The first and second separators 22 and 24 each have a rectangular shape in plan view and have protrusions and recesses in sectional view, which are formed by press-molding a thin metal plate into wave-like shapes. The first and second separators 22 and 24 may be, for example, carbon separators.

An oxidant gas inlet manifold 26a, a coolant inlet manifold 28a, and a fuel gas inlet manifold 30a are arranged in the direction of arrow B in an upper end portion of the fuel cell 12 in the direction of arrow C (vertical direction in FIG. 3). The oxidant gas inlet manifold 26a, the coolant inlet manifold 28a, and the fuel gas inlet manifold 30a extend through the fuel cell 12 in the direction of arrow A. An oxidant gas, such as an oxygen-containing gas, is supplied through the oxidant gas inlet manifold 26a. A coolant is supplied through the coolant inlet manifold 28a. A fuel gas, such as a hydrogen-containing gas, is supplied through the fuel gas inlet manifold 30a.

A fuel gas outlet manifold 30b, a coolant outlet manifold 28b, and an oxidant gas outlet manifold 26b are arranged in the direction of arrow B in a lower end portion of the fuel cell 12 in the direction of arrow C. The fuel gas outlet manifold 30b, the coolant outlet manifold 28b, and the oxidant gas outlet manifold 26b extend through the fuel cell 12 in the direction of arrow A. The fuel gas is discharged through the fuel gas outlet manifold 30b. The coolant is discharged through the coolant outlet manifold 28b. The oxidant gas is discharged through the oxidant gas outlet manifold 26b.

An oxidant gas channel 32 is formed on a surface 22a of the first separator 22 that faces the membrane electrode assembly 20. The oxidant gas channel 32 is connected to the oxidant gas inlet manifold 26a and to the oxidant gas outlet manifold 26b.

A fuel gas channel 34 is formed on a surface 24a of the second separator 24 that faces the membrane electrode assembly 20. The fuel gas channel 34 extends in the vertical direction, and is connected to the fuel gas inlet manifold 30a and to the fuel gas outlet manifold 30b.

A coolant channel 36 is formed between a surface 22b of the first separator 22 of the fuel cell 12 and a surface 24b of the second separator 24 of another fuel cell 12 that is adjacent to the fuel cell 12. The coolant channel 36 extends in the vertical direction and is connected to the coolant inlet manifold 28a and to the coolant outlet manifold 28b.

A first sealing member 38 is integrally or separately formed on the surfaces 22a and 22b of the first separator 22. A second sealing member 40 is integrally or separately formed on the surfaces 24a and 24b of the second separator 24. The first and second sealing members 38 and 40 may be made of, for example, a sealing material, a cushioning material, or a packing material, such as an EPDM, an NBR, a fluorocarbon rubber, a silicone rubber, a fluorosilicone rubber, a butyl rubber, a natural rubber, a styrene rubber, a chloroprene rubber, or an acrylic rubber.

The membrane electrode assembly 20 includes a solid-polymer electrolyte membrane 42, and a cathode electrode 44 and an anode electrode 46 that sandwich the solid polymer electrolyte membrane 42 therebetween. The solid-polymer electrolyte membrane 42 is, for example, a thin film made of a perfluorosulfonate polymer that is impregnated with water.

The cathode electrode 44 and the anode electrode 46 each include a gas diffusion layer and an electrode catalyst layer. The gas diffusion layer is made of carbon paper or the like. The electrode catalyst layer is made by uniformly coating a surface of the gas diffusion layer with porous carbon particles whose surfaces support a platinum alloy. The electrode catalyst layer is disposed on each side of the solid polymer electrolyte membrane 42.

As illustrated in FIG. 2, recesses 48a and 48b are formed in the insulation plates 16a and 16b, and the terminal plates 14a and 14b are disposed in the recesses 48a and 48b.

Figure 4:
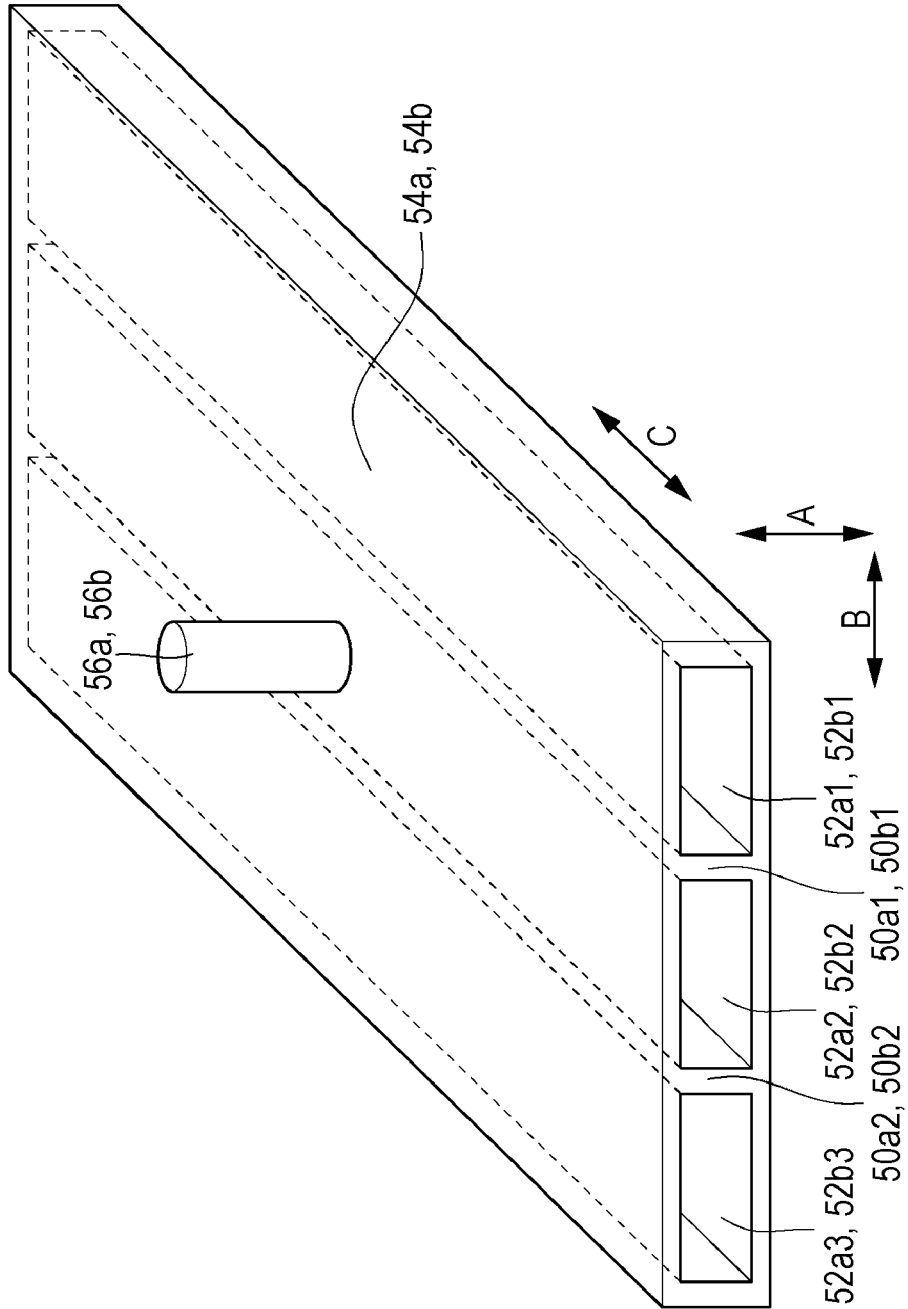
FIG. 4 is a perspective view of a terminal plate of the fuel cell stack.

As illustrated in FIGS. 2 and 4, the terminal plate 14a has a plurality of spaces formed therein. In this example, three spaces 52a1, 52a2, and 52a3, which are separated by two partition walls 50a1 and 50a2, are formed in the terminal plate 14a. The partition walls 50a1 and 50a2 extend linearly from one end of the terminal plate 14a to the other end (opposite end) of the terminal plate 14a (in the direction of arrow C in FIG. 4) The spaces 52a1, 52a2, and 52a3 extend trough the terminal plate 14a from the one end to the other end of the terminal plate 14a. To be specific, the terminal plate 14a is made of a electroconductive material such as aluminum or copper, and the partition walls 50a1 and 50a2 are formed by extrusion or drawing.

A connection terminal 56a (power output terminal) is formed on a plate surface 54a of the terminal plate 14a that faces the insulation plate 16a. The connection terminal 56a is disposed at a position at which the connection terminal 56a does not overlap the partition walls 50a1 and 50a2 in the stacking direction (direction of arrow A), that is, for example, at a position at which the connection terminal 56a overlaps the space 52a2 in the stacking direction. The connection terminal 56a protrudes outward from the end plate 18a in the stacking direction.

The connection terminal 56a, which has a cylindrical shape, is fixed to the plate surface 54a by friction stir welding (FSW) or by friction welding (FW). The connection terminal 56a is covered by an insulation sleeve 58a and is inserted into the end plate 18a. The shape of the connection terminal 56a is not limited to cylindrical, and may be prism-like or L-shaped.

The terminal plate 14b has the same structure as the terminal plate 14a. Therefore, the elements of the terminal plate 14b the same as those of the terminal plate 14a will be denoted by adding "b" instead of "a" to the numerals of the elements, and detailed description thereof will be omitted.

As illustrated in FIG. 1, a plurality of tie rods 60 extend between the end plate 18a and the end plate 18b. The tie rods 60 have a long plate-like shape. Two tie rods 60 are disposed on each of long-edge sides of the fuel cell stack 10, and one tie rod 60 is disposed on each of short-edge sides of the fuel cell stack 10. Ends of the tie rods 60 in the direction of arrow A are fixed to sides of the end plate 18a and to sides of the end plate 18b by using bolts 62. A predetermined clamp load is applied to the end plates 18a and 18b in the stacking direction.

Hereinafter, the operation of the fuel cell stack 10 will be described.

As illustrated in FIG. 1, an oxidant gas, such as an oxygen-containing gas, is supplied to the oxidant gas inlet manifold 26a. A fuel gas, such as a hydrogen-containing gas, is supplied to the fuel gas inlet manifold 30a. A coolant, such as pure water, ethylene glycol, or oil, is supplied to the coolant inlet manifold 28a.

As illustrated in FIG. 3, the oxidant gas is introduced through the oxidant gas inlet manifold 26a to the oxidant gas channel 32 of the first separator 22. The oxidant gas flows downward in the direction of arrow C, and is supplied to the cathode electrode 44 of the membrane electrode assembly 20.

The fuel gas is introduced through the fuel gas inlet manifold 30a to the fuel gas channel 34 of the second separator 24. The fuel gas flows downward in the direction of arrow C, and is supplied to the anode electrode 46 of the membrane electrode assembly 20.

The oxidant gas and the fuel gas, which are respectively supplied to the cathode electrode 44 and the anode electrode 46, cause electrochemical reactions in the electrode catalyst layers of the membrane electrode assembly 20, thereby generating electric power. The fuel cells 12 are electrically connected to each other. The electric power is output through the connection terminals 56a and 56b of the terminal plates 14a and 14b, which are disposed at ends of the stack of fuel cells 12 in the stacking direction. The electric power is used, for example, to drive an electric motor of a vehicle (not shown).

The oxidant gas that has been supplied to the cathode electrode 44 and consumed is discharged through the oxidant gas outlet manifold 26b in the direction of arrow A. The fuel gas that has been supplied to the anode electrode 46 and consumed is discharged through the fuel gas outlet manifold 30b in the direction of arrow A.

The coolant that has been supplied to the inlet manifold 28a is introduced into the coolant channel 36 between the first and second separators 22 and 24, and flows downward in the direction of arrow C. The coolant cools the membrane electrode assembly 20, and is then discharged to the coolant outlet manifold 28b.

As illustrated in FIGS. 2 and 4, in the first embodiment, the terminal plate 14a has the three spaces 52a1, 52a2, and 52a3 formed therein, which are separated by the two partition walls 50a1 and 50a2. Therefore, the spaces 52a1, 52a2, and 52a3 in the terminal plate 14a serve as a heat insulating layer, whereby it is possible to significantly reduce heat dissipation from the terminal plate 14a.

Moreover, the connection terminal 56a is formed on the plate surface 54a of the terminal plate 14a that faces the insulation plate 16a. The connection terminal 56a is disposed at a position at which the connection terminal 56a does not overlap the partition walls 50a1 and 50a2 in the stacking direction (that is, for example, at a position at which the connection terminal 56a overlaps the space 52a2 in the stacking direction).

Figure 5:
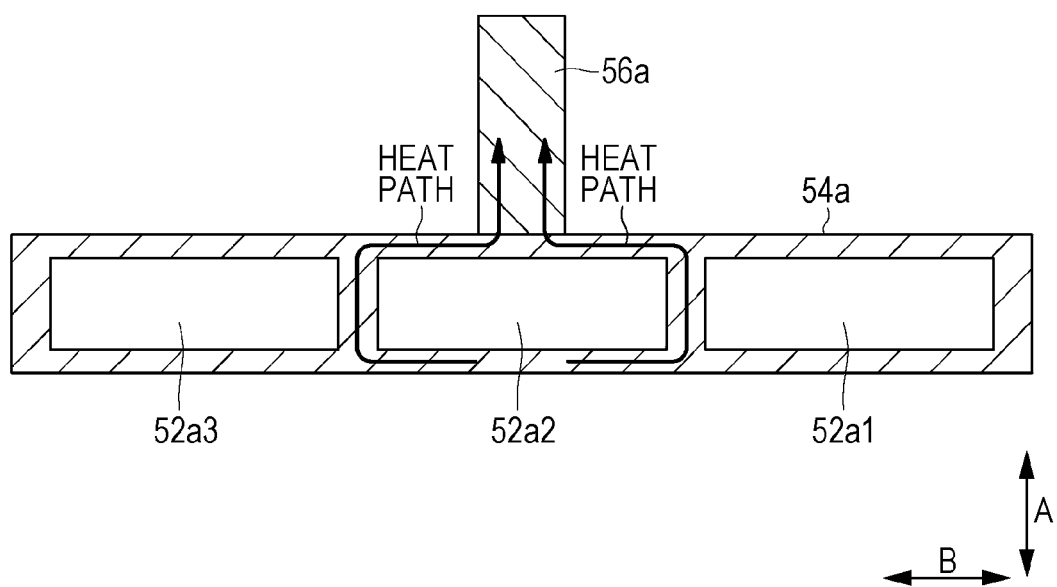
FIG. 5 illustrates a heat path in the terminal plate.

As a result, as illustrated in FIG. 5, the length of a path (heat path) along which heat is transferred from the fuel cell 12 that is disposed at an end of the stack 13 to the connection terminal 56a is considerably increased. Thus, dissipation of heat from the connection terminal 56a is effectively reduced. In particular, an advantage is obtained in that it is possible to prevent decrease in the power generation performance of the fuel cell 12 that is disposed at an end in the stacking direction due to decrease in temperature.

In the terminal plate 14a, the partition walls 50a1 and 50a2 extend linearly from one end of the terminal plate 14a to the other end (opposite end) of the terminal plate 14a (in the direction of arrow C in FIG. 4) The spaces 52a1, 52a2, and 52a3 extend trough the terminal plate 14a from the one end to the other end of the terminal plate 14a.

Therefore, it is possible to form the spaces 52a1, 52a2, and 52a3 in the terminal plate 14a by extrusion or drawing, so that the terminal plate 14a can be made at a low cost, which brings an economical advantage. The spaces 52a1, 52a2, and 52a3 are open toward the short sides of the terminal plate 14a. However, this is not limited thereto, and the spaces 52a1, 52a2, and 52a3 may be open toward the long sides of the terminal plate 14a.

Figure 6:
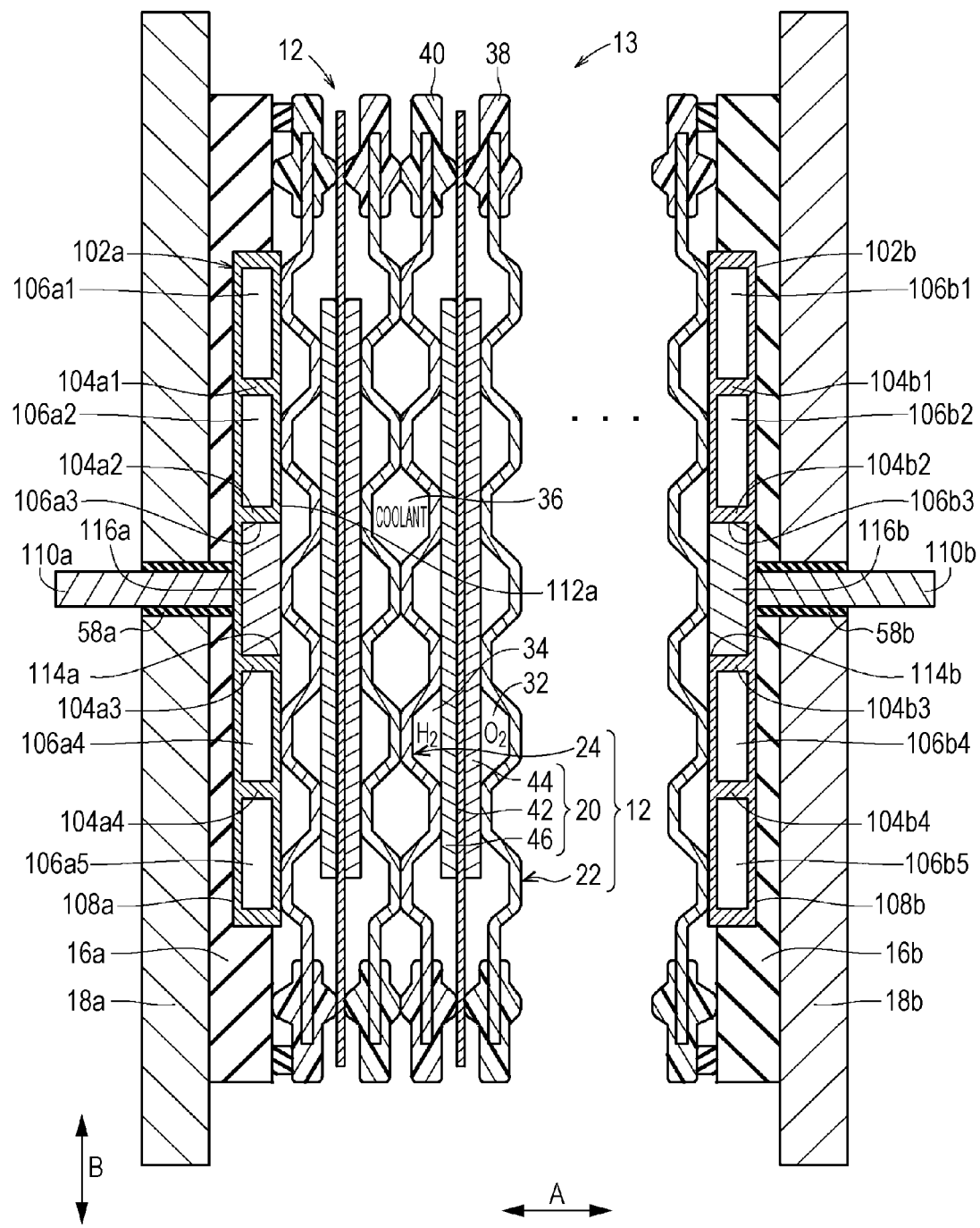
FIG. 6 is a sectional view of a fuel cell stack according to a second embodiment of the present invention.

FIG. 6 is a schematic sectional view of a fuel cell stack 100 according to a second embodiment of the present invention. The elements the same as those of the fuel cell stack 10 according to the first embodiment will be denoted by the same numerals and detailed description thereof will be omitted.

The fuel cell stack 100 includes terminal plates 102a and 102b. The terminal plate 102a has a plurality spaces formed therein. In the example illustrated in FIG. 6, five spaces 106a1, 106a2, 106a3, 106a4, and 106a5, which are separated by four partition walls 104a1, 104a2, 104a3, and 104a4, are formed in the terminal plate 102a.

In the terminal plate 102a, the partition walls 104a1, 104a2, 104a3, and 104a4 extend linearly from one end of the terminal plate 102a to the other end (opposite end) of the terminal plate 102a. The spaces 106a1, 106a2, 106a3, 106a4, and 106a5 extend trough the terminal plate 102a from the one end to the other end of the terminal plate 102a.

A connection terminal 110a (power output terminal) is formed on a plate surface 108a of the terminal plate 102a that faces the insulation plate 16a. The connection terminal 110a is disposed at a position at which the connection terminal 110a does not overlap the partition walls 104a1, 104a2, 104a3, and 104a4 in the stacking direction (direction of arrow A), that is, for example, at a position at which the connection terminal 110a overlaps the space 106a3 in the stacking direction. The connection terminal 110a protrudes outward from the end plate 18a in the stacking direction.

The terminal plate 102a has a space 106a3 formed in a plate surface 112a thereof that is opposite to the plate surface 108a on which the connection terminal 110a is disposed. The space 106a3 overlaps the connection terminal 110a in the stacking direction, and has an opening 114a that is used for an welding operation. A block member 116a that receives the connection terminal 110a is disposed in the space 106a3 having the opening 114a. The block member 116a serves as a backing member that supports the connection terminal 110a from the back side. The block member 116a is made of a low- or non-heat conducting material.

The terminal plate 102b has the same structure as the terminal plate 102a. Therefore, the elements of the terminal plate 102b the same as those of the terminal plate 102a will be denoted by adding "b" instead of "a" to the numerals of the elements, and detailed description thereof will be omitted.

The second embodiment has advantages the same as those of the first embodiment. Moreover, the connection terminal 110a and 110b are more securely supported due to the block members 116a and 116b, which serve as backing members for the connection terminals 110a and 110b.

According to the embodiment of the present invention, a fuel cell stack includes a stack of fuel cells, each of the fuel cells including a membrane electrode assembly and a separator that are stacked, the membrane electrode assembly including an electrolyte membrane and a pair of electrodes sandwiching the electrolyte membrane therebetween; and a terminal plate, an insulation plate, and an end plate that are stacked at each end of the stack of the fuel cells in a stacking direction of the fuel cells.

In the fuel cell stack, the terminal plate has a plurality of spaces formed therein, and the spaces are separated from each other by a partition wall. A connection terminal is disposed on a plate surface of the terminal plate, the plate surface facing the insulation plate, at a position at which the connection terminal does not overlap the partition wall in the stacking direction. The connection terminal protrudes outward from the end plate in the stacking direction.

It is preferable that the partition wall extend from one end of the terminal plate to the other end of the terminal plate, the ends being opposite each other, and the spaces extend through the terminal plate from the one end to the other end.

It is preferable that the terminal plate have an opening in a plate surface of the terminal plate, the plate surface being opposite to the plate surface on which the connection terminal is disposed, and the opening be connected to one of the spaces that overlaps the connection terminal in the stacking direction.

It is preferable that a block member that receives the connection terminal be disposed in the one of the spaces that is connected to the opening.

With the embodiment of the present invention, a plurality of spaces, which are separated by a partition wall, are formed in the terminal plate, and the spaces serve as a heat insulating layer. Therefore, dissipation of heat from the terminal plate is substantially reduced.

Moreover, a connection terminal is disposed on the terminal plate at a position at which the connection terminal does not overlap the partition wall in the stacking direction, i.e., at which the connection terminal overlaps one of the spaces in the stacking direction, so as to protrude outward in the stacking direction. Therefore, the length of a heat transfer path extending from a fuel cell that is disposed at an end of the fuel cell stack in the stacking direction to the connection terminal is increased, whereby dissipation of heat from the connection terminal is effectively reduced. Thus, in particular, it is possible to prevent decrease in the power generation performance of the fuel cell that is disposed at an end of the fuel cell stack in the stacking direction due to decrease in temperature.

Obviously, numerous modifications and variations of the present invention are possible in light of the above teachings. It is therefore to be understood that within the scope of the appended claims, the invention may be practiced otherwise than as specifically described herein.

What is claimed is:

1. A fuel cell stack comprising:
a stack of fuel cells, each of the fuel cells including a membrane electrode assembly and a separator that are stacked, the membrane electrode assembly including an electrolyte membrane and a pair of electrodes sandwiching the electrolyte membrane therebetween;
a terminal plate including a first plate portion, a second plate portion, and a first partition wall, the first plate portion being provided at an end of the stack of the fuel cells, the second plate portion being spaced from the first plate portion in a stacking direction of the fuel cells, the first partition wall being provided between the first and second plate portions and connecting the first plate portion to the second plate portion, the terminal plate including a plurality of spaces provided between the first and second plate portions, the spaces being separated from each other by the first partition wall, the terminal plate including a first plate surface and a second plate surface opposite to the first plate surface, the first plate surface being provided on the first plate portion, the second plate surface being provided on the second plate portion;
an insulation plate provided on the second plate portion of the terminal plate;
an end plate provided on the insulation plate, the insulation plate being provided between the terminal plate and the end plate; and
a connection terminal disposed on the second plate surface of the terminal plate at a position at which the connection terminal does not overlap the first partition wall in the stacking direction, the second plate surface facing the insulation plate, the connection terminal protruding outward from the end plate in the stacking direction.

2. The fuel cell stack according to claim 1,
wherein the first partition wall extends from one end of the terminal plate to another end of the terminal plate along a direction perpendicular to the stacking direction, the one end and the another end being opposite each other, and
wherein the spaces extend through the terminal plate from the one end to the another end along the direction perpendicular to the stacking direction.

3. The fuel cell stack according to claim 1,
wherein the first plate portion has an opening provided in the first plate surface of the terminal plate, the spaces including a first space overlapping the connection terminal in the stacking direction, the opening being connected to the first space.

4. The fuel cell stack according to claim 3, further comprising:
a block member disposed in the first space to receive the connection terminal and overlapping the connection terminal in the stacking direction.

5. The fuel cell stack according to claim 1,
wherein the insulation plate has a recess on a surface of the insulation plate, and the terminal plate is disposed in the recess.

6. The fuel cell stack according to claim 1,
wherein the first partition wall extends from the first plate portion to the second plate portion in the stacking direction.

7. The fuel cell stack according to claim 1,
wherein the terminal plate includes a second partition wall provided between the first and second plate portions and connecting the first plate portion to the second plate portion, and
wherein the spaces includes first to third spaces, the first and second spaces being separated from each other by the first partition wall, the first and third spaces being separated from each other by the second partition wall.

8. The fuel cell stack according to claim 7,
wherein the first space is defined by the first and second plate portions and the first and second partition walls, and overlaps the connection terminal in the stacking direction.

9. The fuel cell stack according to claim 7,
wherein the first partition wall extends from the first plate portion to the second plate portion in the stacking direction, and
wherein the second partition wall extends from the first plate portion to the second plate portion in the stacking direction.

* * * * *